(12) United States Patent
Xiang et al.

(10) Patent No.: US 11,414,324 B2
(45) Date of Patent: Aug. 16, 2022

(54) METHOD FOR EXTRACTING LITHIUM FROM SALT LAKE BRINE AND SIMULTANEOUSLY PREPARING ALUMINUM HYDROXIDE

(71) Applicant: Beijing University of Chemical Technology, Beijing (CN)

(72) Inventors: Xu Xiang, Beijing (CN); Xue Duan, Beijing (CN)

(73) Assignee: BEIJING UNIVERSITY OF CHEMICAL TECHNOLOGY, Beijing (CN)

(*) Notice: Subject to any disclaimer, the term of this patent is extended or adjusted under 35 U.S.C. 154(b) by 370 days.

(21) Appl. No.: 16/648,660

(22) PCT Filed: Apr. 19, 2019

(86) PCT No.: PCT/CN2019/083422
§ 371 (c)(1),
(2) Date: Mar. 18, 2020

(87) PCT Pub. No.: WO2020/133826
PCT Pub. Date: Jul. 2, 2020

(65) Prior Publication Data
US 2021/0221697 A1    Jul. 22, 2021

(30) Foreign Application Priority Data

Dec. 26, 2018   (CN) .......................... 201811597145.9

(51) Int. Cl.
*C01D 15/08*    (2006.01)
*B01D 9/00*     (2006.01)
*C01F 7/34*     (2006.01)

(52) U.S. Cl.
CPC .......... *C01D 15/08* (2013.01); *B01D 9/0018* (2013.01); *B01D 9/0045* (2013.01); *C01F 7/34* (2013.01);
(Continued)

(58) Field of Classification Search
CPC .... C01D 15/08; B01D 9/0018; B01D 9/0045; C01F 7/34
See application file for complete search history.

(56) References Cited

FOREIGN PATENT DOCUMENTS

CN    101775505 B    8/2011
CN    102070162 B    10/2012
(Continued)

OTHER PUBLICATIONS

First Office Action dated Mar. 4, 2020 for counterpart Chinese patent application No. 201811597145.9, along with machine EN translation downloaded from EPO.
(Continued)

*Primary Examiner* — James A Fiorito
(74) *Attorney, Agent, or Firm* — Tope-McKay & Associates (57) ABSTRACT

Described is a method for extracting lithium from salt lake brine and simultaneously preparing aluminum hydroxide. This method includes a. adding an aluminum salt to the brine, adding an alkali solution, then subjecting to crystallization reaction and solid-liquid separation to obtain lithium-containing brine; b. evaporating and concentrating the lithium-containing brine, adding an aluminum salt, adding an alkali solution dropwise to perform a co-precipitation reaction and solid-liquid separation to obtain a lithium-containing layered material filter cake, wherein in steps a and b, the alkali solution is an alkali solution free of carbonate ion; c. dispersing the lithium-containing layered material filter cake in deionized water to form a suspension
(Continued)

slurry, then adjusting the pH value of the suspension slurry so as to carry out a lithium deintercalation reaction; d. filtering to obtain aluminum hydroxide filter cake; e. washing the aluminum hydroxide filter cake with deionized water and drying.

19 Claims, 1 Drawing Sheet

(52) U.S. Cl.
CPC .. *B01D 2009/0086* (2013.01); *C01P 2002/01* (2013.01); *C01P 2002/72* (2013.01); *C01P 2006/82* (2013.01)

(56) References Cited

FOREIGN PATENT DOCUMENTS

| | | |
|---|---|---|
| CN | 103086405 B | 12/2013 |
| CN | 105152193 A | 12/2015 |
| CN | 107043116 A | 8/2017 |

OTHER PUBLICATIONS

Search report dated Mar. 4, 2020 for counterpart Chinese patent application No. 201811597145.9, along with machine EN translation downloaded from EPO.

METHOD FOR EXTRACTING LITHIUM FROM SALT LAKE BRINE AND SIMULTANEOUSLY PREPARING ALUMINUM HYDROXIDE

TECHNICAL FIELD

The present disclosure relates to a method for extracting lithium from salt lake brine and simultaneously preparing aluminum hydroxide, specifically, a method for extracting lithium from salt lake brine by reaction/separation coupling technology via a lithium-containing layered material $LiAl_x(OH)_{3x}Cl.mH_2O$ (x=1-10, m=1-10) and simultaneously preparing aluminum hydroxide, which belongs to the technical field of separation and extraction of lithium resource.

BACKGROUND

Lithium ion secondary batteries have been widely used in mobile phones, laptops, new energy vehicles and energy storage fields due to their advantages of large capacity, long service life, no environmental pollution and safe use. In particular, with the increasing global energy crisis, the development of new energy vehicles has become an important part of the national strategy. Owing to full explosion of new energy vehicle market, the global demand for lithium is gradually increasing.

In 2018, the U.S. Geological Survey report showed that the total amount of lithium resources in the world exceeded 53 million tons, including 7 million tons in China. Argentina, Bolivia, Chile, the United States and Australia have 9.8 million tons, 9 million tons, 8.4 million tons, 6.8 million tons and 5 million tons respectively. According to the reserves, China is the largest country of lithium resources after the three countries in South America. The lithium resources mainly exist in brine and ores. Fifty-nine percent of the world's lithium resources are rich in salt lake brine, and in China, up to 75% or more of the lithium resources exist in salt lake brine.

Although China has a great power of lithium resources, the exploitation and utilization ability of the lithium resources is weak and the production is limited. With the increasing demand for lithium resources, there is still a gap between supply and demand of lithium in China, and thus lithium needs to be imported in large quantities, leading to a high dependence of lithium raw materials on foreign countries. Among them, imported spodumene accounts for 66%, and imported high concentration brine accounts for 18%. Lithium resources in China are mainly present in salt lake brine, so extracting lithium from Salt Lake is the necessary way to develop lithium products in China.

The methods for extracting and separating lithium from salt lake brine mainly include precipitation method, extraction method, adsorption method, calcination method, membrane method (electrodialysis, nanofiltration, etc.). Among them, the calcination method is a mature method in the technology of extracting lithium from salt lake brine, but it has high energy consumption and acid mist emission will cause serious air pollution; the adsorption method is a promising method with simple process and high recovery rate, but it has some problems including difficulty in adsorbent recovery, reduction of the adsorption capacity due to the blockage of the ion channel of the adsorbent, dissolution of the adsorbent resulting from the acid treatment, etc.; the extraction method is a technology for extracting lithium from brine by using an organic solvent, which has good selectivity to lithium ion, but has some problems such as large equipment volume, serious corrosion, and difficulty in recovery of extractant, etc.; the membrane method is a new technology of extracting lithium from brine, mainly including electrodialysis, nanofiltration and membrane distillation, and this method has a relatively low energy cost, and good cation selectivity, but there is no high efficient separation membrane material in China, which needs to be imported.

Chinese patent application CN 107043116 A disclosed a method for preparing lithium-aluminum composite metal hydroxide solid from salt lake brine after magnesium removal, comprising obtaining a solution containing lithium ion and aluminum ion by acid dissolution, then concentrating lithium by electrodialysis, and obtaining battery grade lithium carbonate by precipitation reaction. Strong acid was needed in the process, which caused serious corrosion to the equipment.

Chinese patent application CN 105152193 A disclosed a method for efficiently separating magnesium ion and lithium ion in salt lake brine and simultaneously producing magnesium aluminum hydrotalcite (MgAl-LDH) and lithium aluminum hydrotalcite (LiAl-LDH) by reaction/separation coupling technology. However, the prepared LiAl-LDH cannot be directly used to produce lithium products such as lithium carbonate, and lithium hydroxide.

SUMMARY

To solve the above technical problem, an object of the present disclosure is to provide a method for extracting lithium from salt lake brine and simultaneously preparing aluminum hydroxide.

To achieve the above object, the present disclosure provides a method for extracting lithium from salt lake brine and simultaneously preparing aluminum hydroxide, wherein the method includes:

a. adding an aluminum salt to the brine to obtain a mixed salt solution A, adding an alkali solution to the mixed salt solution A for co-precipitation reaction, then subjecting to crystallization reaction and solid-liquid separation at the end of the reaction to obtain magnesium-aluminum hydrotalcite solid product and lithium-containing brine, wherein in step a, the alkali solution is an alkali solution free of carbonate ion;

b. evaporating and concentrating the lithium-containing brine to obtain a lithium-rich brine, adding an aluminum salt to the lithium-rich brine to obtain a mixed salt solution B, adding an alkali solution dropwise to the mixed salt solution B to perform a coprecipitation reaction and solid-liquid separation after the end of the reaction to obtain a lithium-containing liquid and a lithium-containing layered material filter cake, wherein in step b, the alkali solution is an alkali solution free of carbonate ion;

c. dispersing the lithium-containing layered material filter cake in deionized water to form a suspension slurry, then adjusting the pH value of the suspension slurry so as to carry out a lithium deintercalation reaction;

d. filtering the slurry obtained after the lithium deintercalation reaction to obtain a lithium-containing solution and aluminum hydroxide filter cake; and e. washing the aluminum hydroxide filter cake with deionized water and drying to obtain aluminum hydroxide solid.

According to a specific embodiment of the present disclosure, in the method for extracting lithium from salt lake brine and simultaneously preparing aluminum hydroxide, preferably, the brine in step a is sulfate type or chloride type salt lake brine, which is rich in $Li^+$, $Mg^{2+}$, $K^+$, and $Na^+$, and in which the concentration of $Li^+$ is 1-3 g/L, the concentration of $Mg^{2+}$ is 10-30 g/L, the concentration of K is 5-7 g/L, and the concentration of $Na^+$ is 70-90 g/L, with respect to the total volume of the brine.

According to a specific embodiment of the present disclosure, in the method for extracting lithium from salt lake brine and simultaneously preparing aluminum hydroxide, the brine in step a needs to have insoluble impurities filtered out before use.

According to a specific embodiment of the present disclosure, in the method for extracting lithium from salt lake brine and simultaneously preparing aluminum hydroxide, step a may be operated according to the method disclosed in Chinese patent application CN 105152193 A; however, in step a of the present application, the alkali solution is an alkali solution free of carbonate ion, and it can be, for example, an aqueous sodium hydroxide solution and/or an aqueous potassium hydroxide solution;

In addition, in step a, the volume of the alkaline solution is the same as that of the mixed salt solution A, and the number of moles of sodium hydroxide and/or potassium hydroxide in the alkali solution is 1.5-2.5 times of the sum of the moles of magnesium and aluminum elements.

The alkaline solution used in step a of the present application is an alkali solution free of carbonate ion, for example, an aqueous sodium hydroxide solution or an aqueous potassium hydroxide solution, and no carbonate ion is introduced in the method. Moreover, the lithium-rich brine contains a lot of chloride ions. Therefore, the magnesium-aluminum hydrotalcite solid product obtained in step a and the lithium-containing layered material obtained in subsequent step b according to the present application are completely different from the product obtained in Chinese patent application CN 105152193 A.

Furthermore, in step a of the present application, the total concentration of metal ions in the mixed salt solution A is 0.9-1.5 mol/L with respect to the total volume of the mixed salt solution A.

In the mixed salt solution A, the molar ratio of magnesium salt to aluminum salt is 2-4:1.

In step a of the present application, the aluminum salt is one of aluminum nitrate, aluminum sulfate and aluminum chloride.

In step a of the present application, the co-precipitation reaction can be carried out as follows: mixing the mixed salt solution A with the alkaline solution, and rotating at 1000-5000 rpm for 1-10 minutes to obtain crystal nucleus of MgAl-LDH.

In step a of the present application, the crystallization reaction can be carried out as follows: reacting the crystal nucleus of MgAl-LDH obtained from the co-precipitation reaction in step a at 60-90° C. under stirring for 6-24 hours, and solid-liquid separating at the end of the reaction to obtain the filter cake of MgAl-LDH.

In step a of the present application, the filter cake of MgAl-LDH obtained is dried to give a solid product of MgAl-LDH; the drying is performed at 60-80° C. for 6-12 hours.

In step a of the present application, the magnesium-aluminum hydrotalcite solid product (solid product of MgAl-LDH) has the following chemical formula: $[Mg^{2+}_{1-x}Al^{3+}_{x}(OH)_2](Cl^-)_x \cdot nH_2O$, where x=0.2-0.4, n=1-10.

According to a specific embodiment of the present disclosure, in the method for extracting lithium from salt lake brine and simultaneously preparing aluminum hydroxide, preferably, in step b, the lithium ion concentration in the lithium-rich brine is 0.1-0.5 g/L with respect to the total volume of the lithium-rich brine.

According to a specific embodiment of the present disclosure, in the method for extracting lithium from salt lake brine and simultaneously preparing aluminum hydroxide, preferably, in step b, the molar concentration of lithium ion is 1-6 times that of aluminum ion in the mixed salt solution B.

According to a specific embodiment of the present disclosure, in the method for extracting lithium from salt lake brine and simultaneously preparing aluminum hydroxide, preferably, in step b, the aluminum salt is aluminum nitrate and/or aluminum chloride.

According to a specific embodiment of the present disclosure, in the method for extracting lithium from salt lake brine and simultaneously preparing aluminum hydroxide, preferably, in step b, the alkaline solution has a molar concentration of 2-4 mol/L with respect to its total volume; and the alkali solution is dropwise added at a rate of 1-2 mL/min.

According to a specific embodiment of the present disclosure, in the method for extracting lithium from salt lake brine and simultaneously preparing aluminum hydroxide, preferably, in step b, the alkali solution is aqueous sodium hydroxide solution and/or aqueous potassium hydroxide solution.

According to a specific embodiment of the present disclosure, in the method for extracting lithium from salt lake brine and simultaneously preparing aluminum hydroxide, preferably, in step b, the co-precipitation reaction is carried out at a temperature of 40° C.-100° C. for 6-24 hours, with the pH controlled at 7-8 during the reaction.

According to a specific embodiment of the present disclosure, in the method for extracting lithium from salt lake brine and simultaneously preparing aluminum hydroxide, preferably, in step b, the lithium-containing layered material filter cake has a solid content of 60-95%.

According to a specific embodiment of the present disclosure, in the method for extracting lithium from salt lake brine and simultaneously preparing aluminum hydroxide, preferably, in step b, the lithium-containing layered material has the chemical formula $LiAl_x(OH)_{3x}Cl \cdot mH_2O$, where x=1-10, and m=1-10.

According to a specific embodiment of the present disclosure, in the method for extracting lithium from salt lake brine and simultaneously preparing aluminum hydroxide, the molar ratio of Li/Al in the lithium-containing layered material can be measured by ICP, and then the x value in the above formula can be obtained; the water content m is measured by TG-DTA. In the formula, the values of x and m can be either an integer or a decimal, but are usually approximate to an integer.

According to a specific embodiment of the present disclosure, in the method for extracting lithium from salt lake brine and simultaneously preparing aluminum hydroxide, preferably, in step b, the concentration of Li is 0.01-0.05 g/L, the concentration of $K^+$ is 0.5-1 g/L, the concentration of Na is 40-60 g/L, the concentration of $Cl^-$ is 50-70 g/L, and the concentration of $SO_4^{2-}$ is 1-5 g/L in the lithium-containing liquid, with respect to the total volume of the lithium-containing liquid.

According to a specific embodiment of the present disclosure, preferably, the method for extracting lithium from salt lake brine and simultaneously preparing aluminum hydroxide further includes an operation of evaporating and concentrating the lithium-containing liquid from step b to a lithium ion concentration of 0.1-0.5 g/L (calculated on the basis of the total volume of the lithium-containing liquid after evaporation and concentration) and then recycling it as the lithium-containing brine.

According to a specific embodiment of the present disclosure, in the method for extracting lithium from salt lake brine and simultaneously preparing aluminum hydroxide, preferably, in step c, the suspension slurry has a solid content of 5-50 g/L with respect to the total volume of the suspension slurry.

According to a specific embodiment of the present disclosure, in the method for extracting lithium from salt lake brine and simultaneously preparing aluminum hydroxide, preferably, in step c, the adjusting the pH value of the suspension slurry is to adjust the pH value of the suspension slurry to 5-8.

According to a specific embodiment of the present disclosure, in the method for extracting lithium from salt lake brine and simultaneously preparing aluminum hydroxide, preferably, in step c, the pH value of the suspension slurry is adjusted to 5-8 by using hydrochloric acid or aqueous sodium hydroxide solution with a molar concentration of 2-4 mol/L (calculated on the basis of the total volume of hydrochloric acid or aqueous sodium hydroxide solution).

According to a specific embodiment of the present disclosure, in the method for extracting lithium from salt lake brine and simultaneously preparing aluminum hydroxide, in step c, being too acidic or too alkaline will lead to the dissolution of the product aluminum hydroxide obtained after lithium deintercalation, resulting in the loss of the product; moreover, being too acidic or too alkaline will lead to equipment corrosion, increasing equipment cost and shortening the service life of the equipment. Therefore, in step c of the present application, the pH value of the suspension slurry is adjusted to 5-8 by using hydrochloric acid or aqueous sodium hydroxide solution with the molar concentration of 2-4 mol/L (calculated on the basis of the total volume of hydrochloric acid or aqueous sodium hydroxide solution).

According to a specific embodiment of the present disclosure, in the method for extracting lithium from salt lake brine and simultaneously preparing aluminum hydroxide, preferably, in step c, the lithium deintercalation reaction is carried out at a temperature of 60° C.-100° C. for 30 to 180 minutes.

According to a specific embodiment of the present disclosure, in the method for extracting lithium from salt lake brine and simultaneously preparing aluminum hydroxide, preferably, in step c, the lithium deintercalation reaction is carried out at a stirring rate of 30-200 rpm.

According to a specific embodiment of the present disclosure, in the method for extracting lithium from salt lake brine and simultaneously preparing aluminum hydroxide, in step c, the suspension slurry with pH adjusted can be added to a tank reactor for lithium deintercalation reaction.

According to a specific embodiment of the present disclosure, preferably, the method for extracting lithium from salt lake brine and simultaneously preparing aluminum hydroxide further includes an operation of evaporating and concentrating the lithium-containing solution from step d to a lithium ion concentration of 20-25 g/L (calculated on the basis of the total volume of lithium-containing solution after evaporation and concentration) and then using it as a lithium solution for preparing battery grade lithium carbonate.

According to a specific embodiment of the present disclosure, in the method for extracting lithium from salt lake brine and simultaneously preparing aluminum hydroxide, preferably, in step e, the washing with deionized water is repeated 3 to 5 times.

According to a specific embodiment of the present disclosure, in the method for extracting lithium from salt lake brine and simultaneously preparing aluminum hydroxide, preferably, in step e, the drying is carried out at 60° C.-80° C. for 3-12 hours.

According to a specific embodiment of the present disclosure, the method for extracting lithium from salt lake brine and simultaneously preparing aluminum hydroxide specifically includes the following steps:

A. adding an aluminum salt to brine for co-precipitation reaction with the alkali solution, then subjecting to crystallization reaction and solid-liquid separation to obtain magnesium-aluminum hydrotalcite solid product and lithium-containing brine; this step is operated according to the method in Chinese patent application CN 105152193 A; evaporating and concentrating the above lithium-containing brine to a concentration of lithium ion of 0.1-0.5 g/L, adding thereto solid aluminum chloride to prepare a mixed salt solution, in which the molar concentration of lithium ion is 1-6 times of that of aluminum ion, adding sodium hydroxide solution having the molar concentration of 2-4 mol/L dropwise at a rate of 1-2 mL/min until pH=7-8, heating to 40° C.-100° C. and reacting for 6-24 hours, and filtering by centrifuge, wherein the filter cake is a lithium-containing layered material having the chemical formula $LiAl_x(OH)_{3x}Cl \cdot mH_2O$ where x=1-10, and m=1-10; the filter cake has a solid content of 60-95%; and the filtrate is a lithium-containing liquid;

the lithium-containing liquid contains $Li^+$ at 0.01-0.05 g/L, and further $K^+$ at 0.5-1 g/L, $Na^+$ at 40-60 g/L, $Cl^-$ at 50-70 g/L, and $SO_4^{2-}$ at 1-5 g/L; the filtrate is evaporated and concentrated to a concentration of lithium ion of 0.1-0.5 g/L, and then returned to the lithium-containing brine for recycling.

B. dispersing the above filter cake in deionized water to prepare a suspension slurry having a solid content of 5-50 g/L, adjusting the pH value to 5-8 with hydrochloric acid or sodium hydroxide with a concentration of 2-4 mol/L, adding the suspension slurry into a tank reactor, heating to 60° C.-100° C. under stirring at 30-200 rpm, and maintaining the reaction at constant temperature for 30-180 minutes to carry out lithium deintercalation reaction.

C. filtering the slurry after the lithium deintercalation reaction in step B, wherein the filter cake is $Al(OH)_3$, and the filtrate is a lithium-containing solution; pumping the lithium-containing solution into a tank for mother liquor, evaporating and concentrating the solution to a concentration of lithium ion of 20-25 g/L, thus meeting the concentration requirements of the lithium-containing solution for preparing battery grade lithium carbonate.

D. washing the filter cake in step C with deionized water 3-5 times, and drying at 60° C.-80° C. for 3-12 hours to obtain a white solid that is $Al(OH)_3$ product.

The obtained $Al(OH)_3$ product is detected by using the conventional method in the art, and the main indicators for detection include ignition loss (igloss) and moisture (attached water). The detection results show that the $Al(OH)_3$ product obtained in the present disclosuremeets the requirement of the National Standard GB/T 4294-2010 for aluminum hydroxide, wherein the main indexes and data specified in the National Standard GB/T 4294-2010 are that the ignition loss (igloss) is 34.5±0.5%, and the moisture (attached water) is no more than 12%.

The method for extracting lithium from salt lake brine and simultaneously preparing aluminum hydroxide provided by the present disclosure includes firstly preparing brine into the lithium-containing layered material $LiAl_x(OH)_{3x}Cl \cdot mH_2O$, then dispersing the lithium-containing layered material in water, heating the resultant aqueous solution to deintercalate lithium ion from the lithium-containing layered material solid into the aqueous solution, preparing an aqueous solution containing only lithium ion, concentrating the aqueous solution to reach the concentration for preparing lithium carbonate; and aluminum remains in the solid phase to obtain aluminum hydroxide solid which has a wide application. In this process, lithium is efficiently extracted from brine to prepare battery grade lithium carbonate, and aluminum hydroxide can be obtained from aluminum resource at the same time. The product of aluminum hydroxide thus obtained meets the requirement of the National Standard GB/T 4294-2010 for aluminum hydroxide. Moreover, the equipment will not be corroded since neutral solution or aqueous solution with weak acidity or weak basicity is used in the process.

The present disclosure has remarkable effect as follows:

(1) This method provided by the present disclosure can separate and extract lithium from salt lake brine by preparing lithium-containing layered material $LiAl_x(OH)_{3x}Cl \cdot mH_2O$ (x=1-10, m=1-10), and can obtain aluminum hydroxide; therefore highly efficient and comprehensive utilization of lithium and aluminum resources can be achieved.

(2) The present disclosure is to extract lithium from the lithium-containing layered material, with mild reactions, simple equipments, simple operations, small lithium loss and easy to scale production, thus providing an important way for extracting lithium resources.

DETAILED DESCRIPTION

In order to more clearly understanding the technical features, purposes and beneficial effects of the present disclosure, the implementation process and beneficial effects of the present disclosure will now be described below in details through specific examples and drawings, which is intended to help readers better understand the essence and features of the present disclosure, but not to limit the implementable scope of the present disclosure.

Example 1

Figures 1, 2:
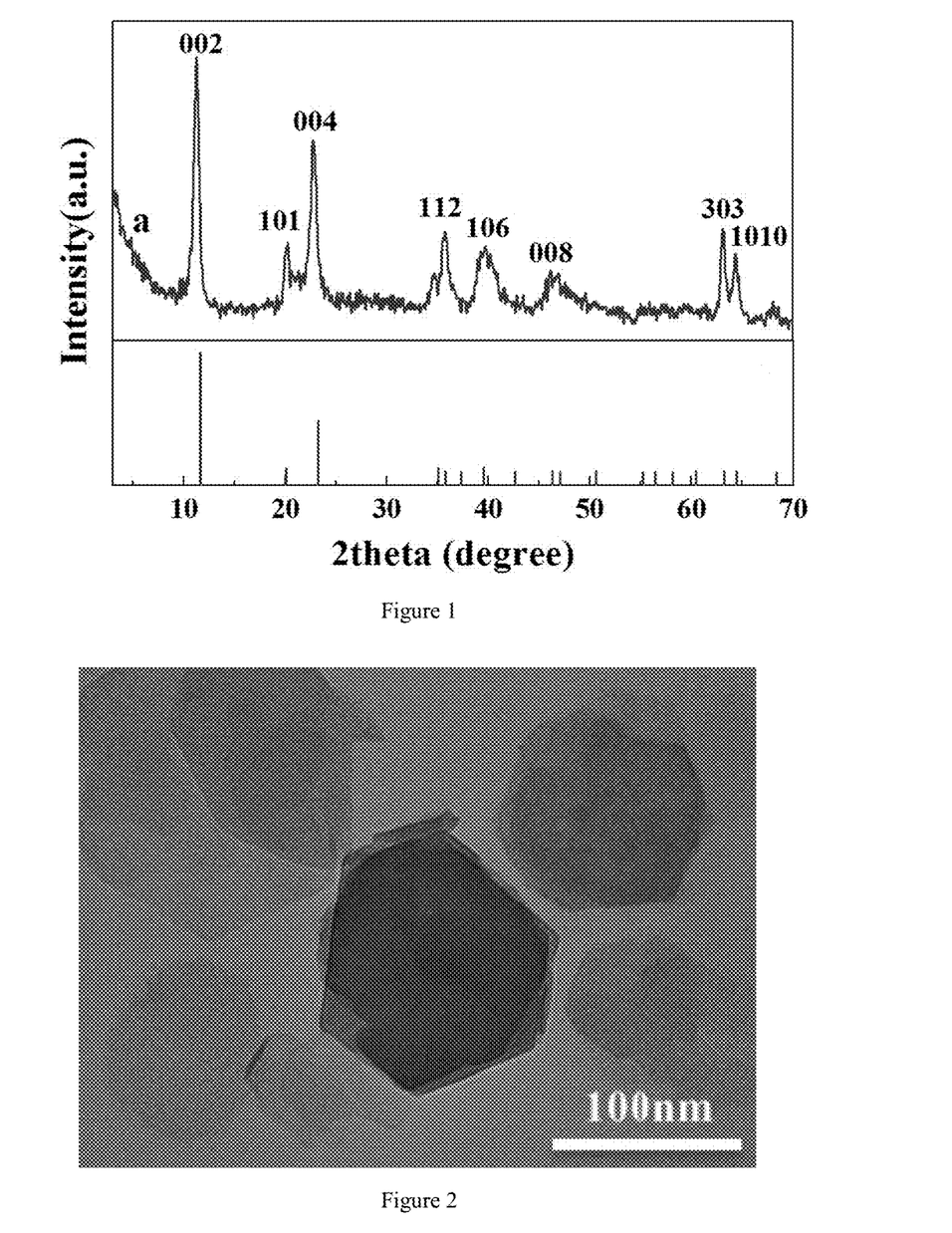
FIG. 1 is the XRD pattern of the lithium-containing layered material prepared in Example 1 of the present disclosure.
FIG. 2 is the transmission electron micrograph of the lithium-containing layered material prepared in Example 1 of the present disclosure.

This Example provides a method for extracting lithium from salt lake brine and simultaneously preparing aluminum hydroxide, wherein the method includes the following steps:

a. According to the method disclosed in Chinese Patent Application CN 105152193 A, weighing 26.0325 g of $MgCl_2 \cdot 6H_2O$, 25.7993 g of $MgSO_4 \cdot 7H_2O$, 18.7290 g of $AlCl_3 \cdot 6H_2O$, 3.3873 g of KCl, 1.8768 g of LiCl, 8.068 g of NaCl, and dissolving the above substances in 250 mL of deionized water to obtain a mixed salt solution A;

weighing 19.8593 g of NaOH, and dissolving it in 250 mL of deionized water to obtain an alkaline solution;

pouring the mixed salt solution A and the alkaline solution into a colloid mill at the same time, and rotating at a speed of 3000 rpm for 3 minutes to form crystal nucleus of MgAl-LDH; transferring the solution of crystal nucleus to a reactor and dynamically crystallizing under stirring at 80° C. for 12 h for growing MgAl-LDH; filtering to obtain a filter cake of MgAl-LDH and drying the filter cake of MgAl-LDH at 70° C. for 12 hours to obtain a white solid MgAl-LDH product; collecting the filtrate to a container, wherein the filtrate is lithium-containing brine.

b. Evaporating and concentrating the lithium-containing brine to a concentration of lithium ion of 0.4432 g/L to obtain a lithium-rich brine, adding 30.83 g of solid aluminum chloride to 1 L of the lithium-rich brine to obtain a mixed salt solution B, adding aqueous sodium hydroxide solution having a molar concentration of 4 mol/L dropwise to the mixed salt solution B at a rate of 1 mL/min until the pH value is 7, reacting at 80° C. for 12 hours, solid-liquid separating after the end of the reaction to obtain a lithium-containing liquid and a filter cake of LiAl-LDH; evaporating and concentrating the filtrate (lithium-containing liquid) to a concentration of lithium ion of 0.3 g/L and returning it to the lithium-containing brine for recycling;

wherein the filter cake of LiAl-LDH is a lithium-containing layered material filter cake, and the lithium-containing layered material has a molecular formula $LiAl_2(OH)_6Cl \cdot 3H_2O$ and a solid content of 85%. The XRD pattern and the transmission electron micrograph of the lithium-containing layered material are shown in FIG. 1 and FIG. 2, respectively.

c. Dispersing 30 g of the filter cake with a solid content of 85% in 3 L of deionized water to prepare a suspension slurry (pH=7), adding the suspension slurry in a tank reactor, heating to 85° C. under stirring at 60 rpm, and maintaining the reaction at a constant temperature for 90 minutes to carry out lithium deintercalation reaction.

d. Filtering the slurry after the lithium deintercalation reaction in step c to obtain a lithium-containing solution and aluminum hydroxide filter cake, evaporating and concentrating the lithium-containing solution to a concentration of lithium ion of 23 g/L, and using the resultant as the lithium-containing solution for preparing battery grade lithium carbonate. The concentration of lithium ion in the filtrate (lithium-containing solution) was 272 mg/L as detected by ICP.

Next, it was calculated through the following equation 1) and equation 2) that the lithium deintercalation rate was 99.8%. It can be seen that in this Example, the lithium loss (which is equal to 1-R) was only 0.2%, which is small.

$$R = C \cdot V / (p \cdot m) \quad \text{equation 1);}$$

In equation 1), R is lithium deintercalation rate, %;

C is the concentration of lithium ion in the filtrate. In this Example, the concentration was 272 mg/L;

V is the volume of the filtrate. In this Example, the volume of the filtrate was 2.582 L;

m is the mass of lithium-containing layered material for reaction. In this Example, the mass was 30 g×85%=25.5 g;

p is a mass percentage of lithium in the lithium-containing layered material. In this Example, the mass percentage of lithium was 2.76%, which was calculated by the following equation 2);

$$p = (c(Li^+)_{LDH} \cdot V_{LDH}) / m_{LDHs} \quad \text{equation 2);}$$

In equation 2), $c(Li^+)_{LDH}$ is the concentration of lithium ion in the lithium-containing layered material measured by ICP. In this Example, the concentration value was 13.8 mg/L; $V_{LDH}$ was 10 mL that is the volume of nitric acid solution used for ICP test; mums was 0.005 g that is the mass of the lithium-containing layered material for ICP test.

e. Washing the filter cake obtained in step d with deionized water 5 times, and drying in an oven at 60° C. for 12 hours to obtain 18.5 g white solid aluminium hydroxide product.

The ignition loss (igloss) and moisture (attached water) of this white solid aluminium hydroxide product was 34.48% and 6.92% respectively, as measured by conventional methods in the art. It can be seen that the $Al(OH)_3$ product prepared by Example 1 of the present disclosuremeets the requirement of the National Standard GB/T 4294-2010 for aluminum hydroxide, wherein the main indexes and data specified in the National Standard GB/T 4294-2010 are that the ignition loss (igloss) is 34.5±0.5%, and the moisture (attached water) is no more than 12%.

Example 2

This Example provides a method for extracting lithium from salt lake brine and simultaneously preparing aluminum hydroxide, wherein the method includes the following steps:

a. According to the method disclosed in Chinese Patent Application CN 105152193 A, weighing 26.0325 g of $MgCl_2.6H_2O$, 25.7993 g of $MgSO_4.7H_2O$, 18.7290 g of $AlCl_3.6H_2O$, 3.3873 g of KCl, 1.8768 g of LiCl, 8.068 g of NaCl, and dissolving the above substances in 250 mL of deionized water to obtain a mixed salt solution A;

weighing 19.8593 g of NaOH, and dissolving it in 250 mL of deionized water to obtain an alkaline solution;

pouring the mixed salt solution A and the alkaline solution into a colloid mill at the same time, and rotating at a speed of 3000 rpm for 3 minutes to form crystal nucleus of MgAl-LDH; transferring the solution of crystal nucleus to a reactor and dynamically crystallizing under stirring at 80° C. for 12 h for growing MgAl-LDH; filtering to obtain a filter cake of MgAl-LDH and drying the filter cake of MgAl-LDH at 70° C. for 12 hours to obtain a white solid MgAl-LDH product; collecting the filtrate to a container, wherein the filtrate is lithium-containing brine.

b. Evaporating and concentrating the lithium-containing brine to a concentration of lithium ion of 0.4385 g/L to obtain a lithium-rich brine, adding 45.76 g of solid aluminum chloride to 1 L of the lithium-rich brine to obtain a mixed salt solution B, adding aqueous sodium hydroxide solution having the molar concentration of 4 mol/L dropwise to the mixed salt solution B at a rate of 1 mL/min until the pH value is 7, reacting at 80° C. for 12 hours, solid-liquid separating after the end of the reaction to obtain a lithium-containing liquid and a filter cake of LiAl-LDH; evaporating and concentrating the filtrate (lithium-containing liquid) to a concentration of lithium ion of 0.4 g/L and returning it to the lithium-containing brine for recycling.

The filter cake of LiAl-LDH is a lithium-containing layered material filter cake, and the lithium-containing layered material has a molecular formula $LiAl_3(OH)_9Cl.5H_2O$ and a solid content of 85%.

c. Dispersing 30 g of the filter cake with a solid content of 85% in 3 L of deionized water, in which the pH value is adjusted to 6 by using 2 mol/L of hydrochloric acid, to prepare a suspension slurry, adding the suspension slurry in a tank reactor, heating to 65° C. under stirring at 80 rpm, and maintaining the reaction at a constant temperature for 90 minutes for lithium deintercalation reaction.

d. Filtering the slurry after the lithium deintercalation reaction in step c to obtain a lithium-containing solution and aluminum hydroxide filter cake, evaporating and concentrating the lithium-containing solution to a concentration of lithium ion of 22 g/L, and using the resultant as the lithium-containing solution for preparing battery grade lithium carbonate. The concentration of lithium ion in the filtrate (lithium-containing solution) was 188 mg/L as detected by ICP.

Next, it was calculated through the following equation 1) and equation 2) that the lithium deintercalation rate was 99%. It can be seen that in this Example, the lithium loss (which is equal to 1-R) was only 1%, which is small.

$$R = C \cdot V/(p \cdot m) \quad \text{equation 1);}$$

In equation 1), R is lithium deintercalation rate, %;
C is the concentration of lithium ion in the filtrate. In this Example, the concentration was 188 mg/L;
V is the volume of the filtrate. In this Example, the volume of the filtrate was 2.552 L;
m is the mass of lithium-containing layered material for reaction. In this Example, the mass was 30 g×85%=25.5 g;
p is a mass percentage of lithium in the lithium-containing layered material. In this Example, the mass percentage of lithium was 1.9%, which was calculated by the following equation 2);

$$p = (c(Li^+)_{LDH} \cdot V_{LDH})/m_{LDHs} \quad \text{equation 2);}$$

In equation 2), $c(Li^+)_{LDH}$ is the concentration of lithium ion in the lithium-containing layered material measured by ICP. In this Example, the concentration value was 9.5 mg/L; $V_{LDH}$ was 10 mL that is the volume of nitric acid solution used for ICP test; $m_{LDHs}$ was 0.005 g that is the mass of the lithium-containing layered material for ICP test.

e. Washing the filter cake obtained in step d with deionized water 5 times, and drying in an oven at 70° C. for 10 hours to obtain 13.8 g white solid aluminium hydroxide product.

The ignition loss (igloss) and moisture (attached water) of this white solid aluminium hydroxide product was 34.5% and 7.69% respectively, as measured by conventional methods in the art. It can be seen that the $Al(OH)_3$ product prepared by Example 2 of the present disclosure meets the requirement of the National Standard GB/T 4294-2010 for aluminum hydroxide, wherein the main indexes and data specified in the National Standard GB/T 4294-2010 are that the ignition loss (igloss) is 34.5±0.5%, and the moisture (attached water) is no more than 12%.

Example 3

This Example provides a method for extracting lithium from salt lake brine and simultaneously preparing aluminum hydroxide, wherein the method includes the following steps:

a. According to the method disclosed in Chinese Patent Application CN 105152193 A, weighing 26.0325 g of $MgCl_2.6H_2O$, 25.7993 g of $MgSO_4.7H_2O$, 18.7290 g of $AlCl_3.6H_2O$, 3.3873 g of KCl, 1.8768 g of LiCl, 8.068 g of NaCl, and dissolving the above substances in 250 mL of deionized water to obtain a mixed salt solution A;

weighing 19.8593 g of NaOH, and dissolving it in 250 mL of deionized water to obtain an alkaline solution;

pouring the mixed salt solution A and the alkaline solution into a colloid mill at the same time, and rotating at a speed of 3000 rpm for 3 minutes to form crystal nucleus of MgAl-LDH; transferring the solution of crystal nucleus to a reactor and dynamically crystallizing under stirring at 80° C. for 12 h for growing MgAl-LDH; filtering to obtain a filter cake of MgAl-LDH and drying the filter cake of MgAl-LDH at 70° C. for 12 hours to obtain a white solid MgAl-LDH product; collecting the filtrate to a container, wherein the filtrate is lithium-containing brine.

b. Evaporating and concentrating the lithium-containing brine to a concentration of lithium ion of 0.4108 g/L to obtain a lithium-rich brine, adding 57.16 g of solid aluminum chloride to 1 L of the lithium-rich brine to obtain a mixed salt solution B, adding aqueous sodium hydroxide solution having a molar concentration of 4 mol/L dropwise to the mixed salt solution B at a rate of 1 mL/min until the pH value is 7, reacting at 80° C. for 12 hours, solid-liquid separating after the end of the reaction to obtain a lithium-containing liquid and filter cake of LiAl-LDH; evaporating and concentrating the filtrate (lithium-containing liquid) to a concentration of lithium ion of 0.2 g/L and returning it to the lithium-containing brine for recycling.

The filter cake of LiAl-LDH is a lithium-containing layered material filter cake, and the lithium-containing layered material has a molecular formula $LiAl_4(OH)_{12}Cl \cdot 7H_2O$, and a solid content of 85%.

c. Dispersing 30 g of the filter cake with a solid content of 85% in 3 L deionized water, in which the pH value is adjusted to 5.5 by using 2 mol/L of hydrochloric acid, to prepare a suspension slurry, adding the suspension slurry in a tank reactor, heating to 65° C. under stirring at 100 rpm, and maintaining the reaction at a constant temperature for 30 minutes to carry out lithium deintercalation reaction.

d. Filtering the slurry after the lithium deintercalation reaction in step c to obtain a lithium-containing solution and aluminum hydroxide filter cake, evaporating and concentrating the lithium-containing solution to a concentration of lithium ion of 21 g/L, and using the resultant as the lithium-containing solution for preparing battery grade lithium carbonate. The concentration of lithium ion in the filtrate (lithium-containing solution) was 142 mg/L as detected by ICP.

Next, it was calculated through the following equation 1) and equation 2) that the lithium deintercalation rate was 98.5%. It can be seen that in this Example, the lithium loss (which is equal to 1-R) was only 1.5%, which is small.

$$R = C \cdot V/(p \cdot m) \quad \text{equation 1);}$$

In equation 1), R is lithium deintercalation rate, %;

C is the concentration of lithium ion in the filtrate. In this Example, the concentration was 142 mg/L;

V is the volume of the filtrate. In this Example, the volume of the filtrate was 2.546 L;

m is the mass of lithium-containing layered material for reaction. In this Example, the mass was 30 g×85%=25.5 g;

p is a mass percentage of lithium in the lithium-containing layered material. In this Example, the mass percentage of lithium was 1.44%, which was calculated by the following equation 2);

$$p = (c(Li^+)_{LDH} \cdot V_{LDH})/m_{LDHs} \quad \text{equation 2);}$$

In equation 2), $c(Li^+)_{LDH}$ is the concentration of lithium ion in the lithium-containing layered material measured by ICP. In this Example, the concentration value was 7.2 mg/L; $V_{LDH}$ was 10 mL that is the volume of nitric acid solution used for ICP test; $m_{LDHs}$ was 0.005 g that is the mass of the lithium-containing layered material for ICP test.

e. Washing the filter cake obtained in step d with deionized water 5 times, and drying in an oven at 80° C. for 8 hours to obtain 9.74 g white solid aluminium hydroxide product.

The ignition loss (igloss) and moisture (attached water) of this white solid aluminium hydroxide product was 34.55% and 8.08% respectively, as measured by conventional methods in the art. It can be seen that the $Al(OH)_3$ product prepared by Example 3 of the present disclosure meets the requirement of the National Standard GB/T 4294-2010 for aluminum hydroxide, wherein the main indexes and data specified in the National Standard GB/T 4294-2010 are that the ignition loss (igloss) is 34.5±0.5%, and the moisture (attached water) is no more than 12%.

Example 4

This Example provides a method for extracting lithium from salt lake brine and simultaneously preparing aluminum hydroxide, wherein the method includes the following steps:

a. According to the method disclosed in Chinese Patent Application CN 105152193 A, weighing 26.0325 g of $MgCl_2 \cdot 6H_2O$, 25.7993 g of $MgSO_4 \cdot 7H_2O$, 18.7290 g of $AlCl_3 \cdot 6H_2O$, 3.3873 g of KCl, 1.8768 g of LiCl, 8.068 g of NaCl, and dissolving the above substances in 250 mL of deionized water to obtain a mixed salt solution A;

weighing 19.8593 g of NaOH, and dissolving it in 250 mL of deionized water to obtain an alkaline solution;

pouring the mixed salt solution A and the alkaline solution into a colloid mill at the same time, and rotating at a speed of 3000 rpm for 3 minutes to form crystal nucleus of MgAl-LDH; transferring the solution of crystal nucleus to a reactor and dynamically crystallizing under stirring at 80° C. for 12 h for growing MgAl-LDH; filtering to obtain a filter cake of MgAl-LDH and drying the filter cake of MgAl-LDH at 70° C. for 12 hours to obtain a white solid that is the product of MgAl-LDH; collecting the filtrate to a container, wherein the filtrate is lithium-containing brine.

b. Evaporating and concentrating the lithium-containing brine to a concentration of lithium ion of 0.4573 g/L to obtain a lithium-rich brine, adding 79.53 g of solid aluminum chloride to 1 L of lithium-rich brine to obtain a mixed salt solution B, adding aqueous sodium hydroxide solution having a molar concentration of 4 mol/L dropwise to the mixed salt solution B at a rate of 1 mL/min until the pH value is 7, reacting at 80° C. for 12 hours, solid-liquid separating after the end of the reaction to obtain a lithium-containing liquid and filter cake of LiAl-LDH; evaporating and concentrating the filtrate (lithium-containing liquid) to a concentration of lithium ion of 0.4 g/L and returning it to the lithium-containing brine for recycling.

The filter cake of LiAl-LDH is a lithium-containing layered material filter cake, and the lithium-containing layered material has a molecular formula $LiAl_5(OH)_{15}Cl \cdot 9H_2O$ and a solid content of 85%.

c. Dispersing 30 g of the filter cake with a solid content of 85% in 1 L of deionized water, in which the pH value is adjusted to 7.5 with 2 mol/L of sodium hydroxide, to prepare a suspension slurry, adding the suspension slurry in a tank reactor, heating to 85° C. under stirring at 120 rpm, and maintaining the reaction at a constant temperature for 90 minutes to carry out lithium deintercalation reaction.

d. Filtering the slurry after the lithium deintercalation reaction in step c to obtain a lithium-containing solution and aluminum hydroxide filter cake, evaporating and concentrating the lithium-containing solution to a concentration of lithium ion of 25 g/L, and using the resultant as the lithium-containing solution for preparing battery grade lithium carbonate. The concentration of lithium ion in the filtrate (lithium-containing solution) was 346 mg/L as detected by ICP.

Next, it was calculated through the following equation 1) and equation 2) that the lithium deintercalation rate was 98.8%. It can be seen that in this Example, the lithium loss (which is equal to 1-R) was only 1.2%, which is small.

$$R = C \cdot V/(p \cdot m) \quad \text{equation 1);}$$

In equation 1), R is lithium deintercalation rate, %;

C is the concentration of lithium ion in the filtrate. In this Example, the concentration was 346 mg/L;

V is the volume of the filtrate. In this Example, the volume of the filtrate was 0.845 L;

m is the mass of lithium-containing layered material for reaction. In this Example, the mass was 30 g×85%=25.5 g;

p is a mass percentage of lithium in the lithium-containing layered material. In this Example, the mass percentage of lithium was 1.16%, which was calculated by the following equation 2);

$$p = (c(Li^+)_{LDH} \cdot V_{LDH})/m_{LDHs} \quad \text{equation 2);}$$

In equation 2), $c(Li^+)_{LDH}$ is the concentration of lithium ion in the lithium-containing layered material measured by ICP. In this Example, the concentration value was 5.8 mg/L; $V_{LDH}$ was 10 mL that is the volume of nitric acid solution used for ICP test; mums was 0.005 g that is the mass of the lithium-containing layered material for ICP test.

e. Washing the filter cake obtained in step d with deionized water 5 times, and drying in an oven at 80° C. for 6 hours to obtain 7.9 g white solid aluminium hydroxide product.

The ignition loss (igloss) and moisture (attached water) of this white solid aluminium hydroxide product was 34.58% and 8.31% respectively, as measured by conventional methods in the art. It can be seen that the $Al(OH)_3$ product prepared by Example 4 of the present disclosure meets the requirement of the National Standard GB/T 4294-2010 for aluminum hydroxide, wherein the main indexes and data specified in the National Standard GB/T 4294-2010 are that the ignition loss (igloss) is 34.5±0.5%, and the moisture (attached water) is no more than 12%.

The invention claimed is:

1. A method for extracting lithium from salt lake brine and simultaneously preparing aluminum hydroxide, the method comprising:
  a. adding an aluminum salt to a salt lake brine to obtain a mixed salt solution A, adding an alkali solution to the mixed salt solution A for co-precipitation reaction, then subjecting to crystallization reaction and solid-liquid separation at the end of the crystallization reaction to obtain magnesium-aluminum hydrotalcite solid product and lithium-containing brine, wherein in step a, the alkali solution is an alkali solution free of carbonate ion;
  b. evaporating and concentrating the lithium-containing brine to obtain a lithium-rich brine, adding an aluminum salt to the lithium-rich brine to obtain a mixed salt solution B, adding an alkali solution dropwise to the mixed salt solution B to perform a co-precipitation reaction and solid-liquid separation after the end of the reaction to obtain a lithium-containing liquid and a lithium-containing layered material filter cake, wherein in step b, the alkali solution is an alkali solution free of carbonate ion and wherein in step b, the lithium-containing layered material has a chemical formula $LiAl_x(OH)_{3x}Cl \cdot mH_2O$, where x=1-10, and m=1-10;
  c. dispersing the lithium-containing layered material filter cake in deionized water to form a suspension slurry, then adjusting the pH value of the suspension slurry so as to carry out a lithium deintercalation reaction;
  d. filtering the slurry obtained after the lithium deintercalation reaction to obtain a lithium-containing solution and aluminum hydroxide filter cake; and
  e. washing the aluminum hydroxide filter cake with deionized water and drying to obtain aluminum hydroxide solid.

2. The method for extracting lithium from salt lake brine and simultaneously preparing aluminum hydroxide according to claim 1, wherein the brine in step a is sulfate type or chloride type salt lake brine, which is rich in Li+, Mg2+, K+, and Na+, and in which the concentration of Li+ is 1-3 g/L, the concentration of Mg2+ is 10-30 g/L, the concentration of K+ is 5-7 g/L, and the concentration of Na+ is 70-90 g/L, with respect to the total volume of the brine.

3. The method for extracting lithium from salt lake brine and simultaneously preparing aluminum hydroxide according to claim 1, wherein in step b, the lithium ion concentration in the lithium-rich brine is 0.1-0.5 g/L with respect to the total volume of the lithium-rich brine.

4. The method for extracting lithium from salt lake brine and simultaneously preparing aluminum hydroxide according to claim 1, wherein in step b, the molar concentration of lithium ion is 1-6 times that of aluminum ion in the mixed salt solution B.

5. The method for extracting lithium from salt lake brine and simultaneously preparing aluminum hydroxide according to claim 1, wherein in step b, the aluminum salt is aluminum nitrate and/or aluminum chloride.

6. The method for extracting lithium from salt lake brine and simultaneously preparing aluminum hydroxide according to claim 1, wherein in step b, the alkali solution has a molar concentration of 2-4 mol/L with respect to its total volume; and the alkali solution is added dropwise at a rate of 1-2 mL/min.

7. The method for extracting lithium from salt lake brine and simultaneously preparing aluminum hydroxide according to claim 1, wherein in step b, the alkali solution is aqueous sodium hydroxide solution and/or aqueous potassium hydroxide solution.

8. The method for extracting lithium from salt lake brine and simultaneously preparing aluminum hydroxide according to claim 1, wherein in step b, the co-precipitation reaction is carried out at a temperature of 40° C.-100° C. for a period of 6-24 hours, with the pH controlled at 7-8 during the reaction.

9. The method for extracting lithium from salt lake brine and simultaneously preparing aluminum hydroxide according to claim 1, wherein in step b, the lithium-containing layered material filter cake has a solid content of 60-95%.

10. The method for extracting lithium from salt lake brine and simultaneously preparing aluminum hydroxide according to claim 1, wherein in step b, the concentration of Li+ is 0.01-0.05 g/L, the concentration of K+ is 0.5-1 g/L, the concentration of Na+ is 40-60 g/L, the concentration of Cl− is 50-70 g/L, and the concentration of $SO_4^{2-}$ is 1-5 g/L in the lithium-containing liquid, with respect to the total volume of the lithium-containing liquid.

11. The method for extracting lithium from salt lake brine and simultaneously preparing aluminum hydroxide according to claim 1, further comprising an operation of evaporating and concentrating the lithium-containing liquid from step b to a lithium ion concentration of 0.1-0.5 g/L and then recycling it as the lithium-containing brine.

12. The method for extracting lithium from salt lake brine and simultaneously preparing aluminum hydroxide according to claim 1, wherein in step c, the suspension slurry has a solid content of 5-50 g/L with respect to the total volume of the suspension slurry.

13. The method for extracting lithium from salt lake brine and simultaneously preparing aluminum hydroxide according to claim 1, wherein in step c, the adjusting the pH value of the suspension slurry is to adjust the pH value of the suspension slurry to 5-8.

14. The method for extracting lithium from salt lake brine and simultaneously preparing aluminum hydroxide according to claim 1, wherein in step c, the pH value of the suspension slurry is adjusted to 5-8 by using hydrochloric acid or aqueous sodium hydroxide solution with a molar concentration of 2-4 mol/L.

15. The method for extracting lithium from salt lake brine and simultaneously preparing aluminum hydroxide according to claim 1, wherein in step c, the lithium deintercalation reaction is carried out at a temperature of 60° C.-100° C. for a period of 30 to 180 minutes.

16. The method for extracting lithium from salt lake brine and simultaneously preparing aluminum hydroxide according to claim 1, wherein in step c, the lithium deintercalation reaction is carried out at a stirring rate of 30-200 rpm.

17. The method for extracting lithium from salt lake brine and simultaneously preparing aluminum hydroxide according to claim 1, further comprising an operation of evaporating and concentrating the lithium-containing solution from step d to a lithium ion concentration of 20-25 g/L and then using it as a lithium solution for preparing battery grade lithium carbonate.

18. The method for extracting lithium from salt lake brine and simultaneously preparing aluminum hydroxide according to claim 1, wherein in step e, the washing with deionized water is repeated 3 to 5 times.

19. The method for extracting lithium from salt lake brine and simultaneously preparing aluminum hydroxide according to claim 1, wherein in step e, the drying is carried out at 60° C.-80° C. for 3-12 hours.

* * * * *